March 19, 1929.   L. H. THOEN   1,706,045

ROLLER BEARING MOUNTING

Filed May 1, 1924

INVENTOR.
LOWELL H. THOEN.
BY
ATTORNEYS.

Patented Mar. 19, 1929.

1,706,045

UNITED STATES PATENT OFFICE.

LOWELL H. THOEN, OF STOCKTON, CALIFORNIA, ASSIGNOR, BY MESNE ASSIGNMENTS, TO WESTERN HARVESTER CO., OF SAN FRANCISCO, CALIFORNIA, A CORPORATION OF CALIFORNIA.

ROLLER-BEARING MOUNTING.

Application filed May 1, 1924. Serial No. 710,424.

This invention relates to roller bearings and a mounting therefor, especially intended for use in combined harvesters or other machines which are subjected to considerable strains and twists in operation.

In a combined harvester, for example, great difficulty has been experienced in respect to the wear on various shafts, spindles, etc. and breakage of the side walls of the harvester, due to the twisting and straining thereof when the harvester is passing over rough and uneven ground.

The object of the present invention is to overcome these difficulties. This I accomplish by the provision of a roller bearing having a self-aligning cage which has universal rocking movement, thus overcoming binding of the shaft and twisting and straining of the walls in which the bearing is mounted.

One form which my invention may assume is exemplified in the following description and illustrated in the accompanying drawings, in which—

Figure 2:
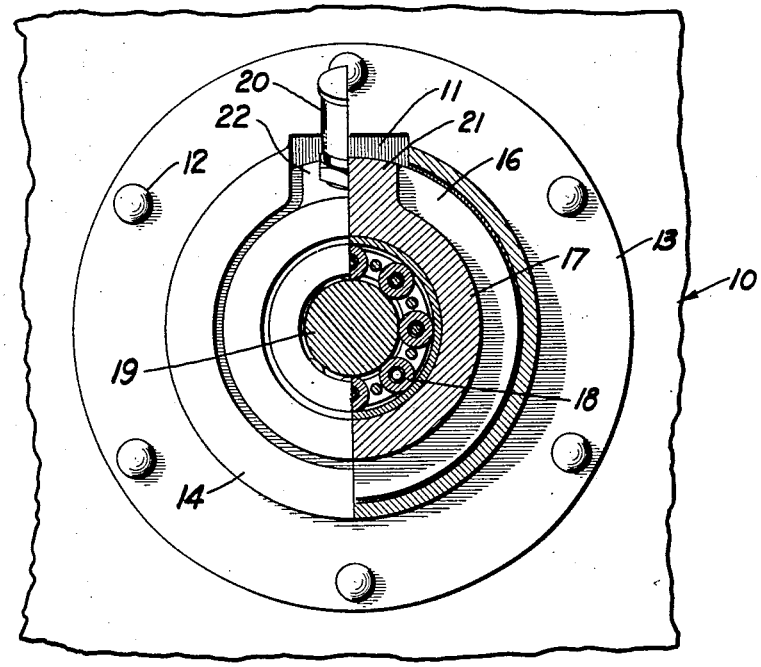
Fig. 2 shows an end elevation of the same, partly in section.
Figure 1:
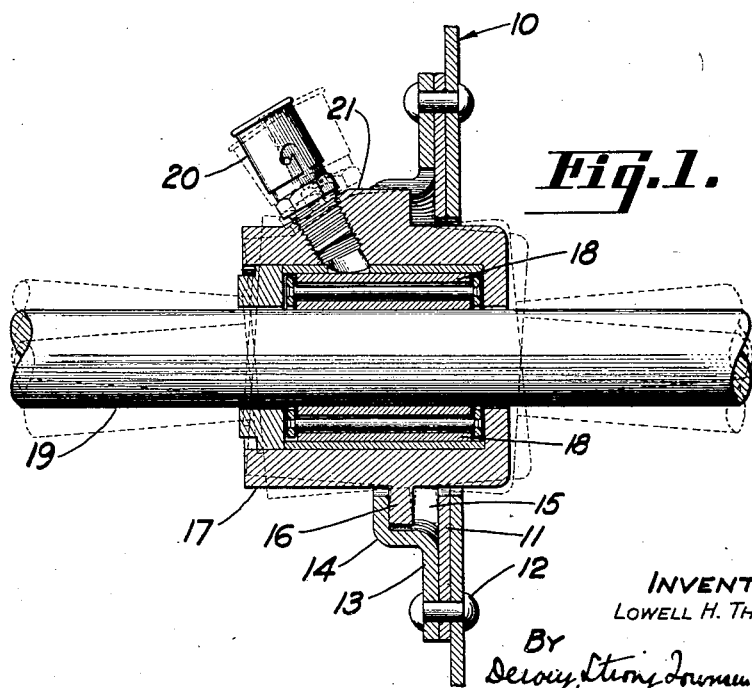
Fig. 1 shows a longitudinal sectional view of a bearing and mounting embodying my invention.

The wall on which the bearing and housing are mounted is indicated at 10. As here shown it is comparatively thin sheet metal and is reinforced with a ring 11. Secured to the ring and side wall by rivets 12 or the like is a retaining ring 13 formed at its inner circumference with an L-shaped flange 14. This L-shaped flange, in conjunction with the retaining ring 11, forms an annular groove or pocket 15 in which is received a flange 16 formed on the cage or housing 17 of the roller bearing. The usual rollers 18 are arranged in the housing and a shaft 19 is shown journaled upon these rollers. The flange 16 is of less thickness than the width of the pocket 15 and hence the housing is free to rock in any direction, the action being indicated by dotted lines in Fig. 1.

I also show a grease cup 20 for lubricating the bearing. This cup is screwed into a boss or projection 21 formed on the housing of the bearing and the L-shaped flange 14 at this point is cut away to accommodate said boss. The upper face of the boss is flattened, as indicated at 22, and the cutaway portion of the L-shaped flange contacts with this flattened surface, thus acting to prevent rotation of the housing within the retaining ring.

Such a mounting as the present one has been found to have special advantages in combined harvesters where it is desirable to employ sheet metal walls. The bearings for the many shafts, spindles, etc. must be mounted upon these sheet metal walls and where a rigid mounting is employed the twists and strains incident to the movement of the heavy harvester over rough ground are transmitted by the shafts and roller bearings to the sheet metal walls. In a short time these walls crack or break, the fastening bolts or rivets tend to work loose and there is a constant binding of the shaft in its bearing which soon wears the shaft badly. All these objections are overcome in the present mounting, due to the fact that the housing of the roller bearing is free to rock in any and all directions, and, therefore, twisting strains are taken off the sheet metal walls and the shaft and its bearing are at all times in alignment, thus preventing undue wear.

Various changes in the construction and arrangement of the various parts herein shown and described may be employed without departing from the spirit of my invention as disclosed in the appended claims.

Having thus described my invention, what I claim and desire to secure by Letters Patent is:

In combination with a sheet metal wall and a roller bearing carried thereby, of a housing for the rollers having a circumferential flange, a reinforcing ring for the sheet metal wall surrounding the bearing, a retaining ring secured to the sheet metal wall and to the reinforcing ring, said retaining ring having an L-shaped flange at its inner circumference encompassing the flange on the housing and forming in conjunction with the supporting wall and reinforcing ring an annual pocket or groove of greater width than that of the flange whereby the housing may rock freely in all directions, and a boss on said housing for the reception of a grease cup, said boss having a flattened face in engagement with the retaining ring for preventing rotation of the housing within the said ring.

LOWELL H. THOEN.